United States Patent
Janakiraman et al.

(10) Patent No.: US 6,704,842 B1
(45) Date of Patent: Mar. 9, 2004

(54) MULTI-PROCESSOR SYSTEM WITH PROACTIVE SPECULATIVE DATA TRANSFER

(75) Inventors: Gopalakrishnan Janakiraman, Santa Clara, CA (US); Rajendra Kumar, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/548,009

(22) Filed: Apr. 12, 2000

(51) Int. Cl.[7] .............................................. G06F 12/00
(52) U.S. Cl. .................... 711/141; 711/143; 711/146; 711/147; 711/148; 711/213; 711/204
(58) Field of Search ................................ 711/141, 143, 711/146, 147, 148, 213

(56) References Cited

U.S. PATENT DOCUMENTS

| | | | | |
|---|---|---|---|---|
| 5,881,303 A | * | 3/1999 | Hagersten et al. | 712/30 |
| 6,067,603 A | * | 5/2000 | Carpenter et al. | 711/141 |
| 6,278,716 B1 | * | 8/2001 | Rubenstein et al. | 370/432 |
| 6,286,060 B1 | * | 9/2001 | DiGiorgio et al. | 710/31 |
| 6,374,331 B1 | * | 4/2002 | Janakiraman et al. | 711/141 |
| 6,408,363 B1 | * | 6/2002 | Lesartre et al. | 711/135 |
| 6,470,429 B1 | * | 10/2002 | Jones et al. | 711/138 |

OTHER PUBLICATIONS

An–Chow Lai and Babak Falsafi, "Memory Sharing Predictor: The Key to a Speculative Coherent DSM", International Symposium on Computer Architecture, IEEE, pp. 173–183, 1999.

* cited by examiner

*Primary Examiner*—Matthew Kim
*Assistant Examiner*—Zhuo H. Li

(57) ABSTRACT

A network of memory and coherence controllers is provided which interconnected nodes in a cache-coherent multi-processor system. The nodes contain multiple processors operatively connected via respective caches to associated memory and coherence controllers. The system supports better processor utilization and better application performance by reducing the latency in accessing data by performing proactive speculative data transfers. In being proactive, the system speculates, without specific requests from the processors, as to what data transfers will reduce the latency and will make data transfers according to information derived from the system at any time that data transfers could be made.

37 Claims, 4 Drawing Sheets

MULTI-PROCESSOR SYSTEM WITH PROACTIVE SPECULATIVE DATA TRANSFER

TECHNICAL FIELD

The present invention relates generally to high-performance parallel multi-processor computer systems and more particularly to a speculative recall and/or forwarding method to accelerate overall data transfer between processor caches in cache-coherent multi-processor systems.

BACKGROUND ART

Many high-performance parallel multi-processor computer systems are built as a number of nodes interconnected by a general interconnection network (e.g., crossbar and hypercube), where each node contains a subset of the processors and memory in the system. While the memory in the system is distributed, several of these systems (called NUMA systems for Non-Uniform Memory Architecture) support a shared memory abstraction where all the memory in the system appears as a large memory common to all processors in the system. To support high-performance, these systems typically allow processors in various nodes to maintain copies of memory data in their local caches. Since multiple processors can cache the same data, these systems must incorporate a cache coherence mechanism to keep the copies consistent, or coherent. These cache-coherent systems are referred to as ccNUMA systems and examples are DASH and FLASH from Stanford University, ORIGIN from Silicon Graphics, STING from Sequent Computers, and NUMAL from Data General.

Coherence is maintained in ccNUMA systems using a directory-based coherence protocol. With coherence implemented in hardware, special hardware coherence controllers maintain the coherence directory and execute the coherence protocol. To support better performance, the coherence protocol is usually distributed among the nodes. With current solutions, a coherence controller is associated with each memory unit that manages the coherence of data mapped to that memory unit. Each line of memory (typically a portion of memory tens of bytes in size) is assigned a home node, which manages the sharing of that memory line, and guarantees its coherence.

The home node maintains a directory, which identifies the nodes that possess a copy of the memory line. When a node requires a copy of the memory line, it requests the memory line from the home node. The home node supplies the data from its memory if its memory has the latest data. If another node has the latest copy of the data, the home node directs this node to forward the data to the requesting node. The home node employs a coherence protocol to ensure that when a node writes a new value to the memory line, all other nodes see this latest value. Coherence controllers implement this coherence functionality.

In typical multi-processor systems, exchanging messages on the network and looking up tables are fairly lengthy operations. Hence, substantial time may elapse between the time access to a data block is requested and the time the data block is received from another processor's cache. This latency is especially high when the requesting processor, the memory and coherence controller managing the data block, and the processor with the modified data are in three different nodes of the system since at least three inter-node messages are necessary. For example, this latency may be about 250 processor clock cycles. As processors continue to increase in their speed relative to the speed of the network and memory, this latency will progressively get higher. In many situations (such as when the processor wants to read the memory data block), the processor cannot perform any useful computation while it waits for the data block to arrive from the cache of the other processor. This leads to inefficient utilization of expensive processor resources and overall poor performance of the application.

The long latency in accessing modified data from another processor's and its negative impact on application performance is a well-known problem. Several solutions have been proposed to alleviate this problem. The mechanisms in the prior art all follow the approach of propagating data modifications to the copies in other processor's caches so that a processor can access the latest data in its cache itself.

In the typical cache-coherent multi-processor system, when a memory data block required (for reading or for writing) by a processor is not currently available in its cache, a message must be sent to the memory system requesting a copy of the data block. If the required memory data block is present in another processor's cache with a modified value, this new value must be provided to the requesting processor (this is called a cache-to-cache transfer). With typical coherence protocols, this is accomplished in the following way. When a processor A requires access to a data block, it sends a message to the memory and coherence controller managing the data block requesting a copy of the data block. The memory and coherence controller determines from a table that the data block is potentially in a modified state in another processor B's cache. The memory and coherence controller sends a message to processor B requesting that the data block be sent to processor A. Upon receiving the message, processor B sends the data block to processor A and also notifies the memory and coherence controller that it has done so.

In other past multi-processor systems, which use write-update coherence protocols, when a processor modified a data block in its cache, the modified data block is immediately forwarded to all processors that have a copy of the data block in their cache. Since all copies of the data block are updated on every write, a processor accessing the data block in its cache will observe the latest value of the data block in its cache itself. The processor's access, hence, does not incur the latency of network messages and table lookup. Write-update protocols are not suitable, however, for several reasons. Firstly, commercial microprocessors do not support the write-update protocol (they support the write-invalidate protocol). Since the cache hierarchy in commercial processors is write-back, the caches do not propagate each write to the processor bus. Also, when a data block is to be modified, most processor bus protocols invalidate the data block in all other caches rather than updating them with the new value. Furthermore, while updates require that data be supplied to a cache that did not request it, processor bus protocols do not support any transaction that transfers data without an associated request on the bus. Secondly, write-update protocols are wasteful in bandwidth and can degrade performance. Updating all copies of a data block on each write to the data block can be wasteful because a processor receiving the updates may not use the data block at all. Also, updates of each individual write may be unnecessary in cases when a processor uses the data block only after a series of modifications to the data block have been completed. Updates also impose substantial bandwidth load on the buses, networks and processor caches. This bandwidth load can cause increased contention and queuing delays in the system degrading performance. Thirdly, since updates are sent only to processors that have a copy of the data block, write-update protocols do not provide any benefit when a processor's cache does not contain a copy of the data block.

Other past multiprocessor systems use what is known as the competitive-update mechanism, which is a hybrid between write-invalidate protocols and write-update protocols. As with write-update protocols, when a data block is modified all copies of the data block are updated. However, when a processor receiving the updates has not accessed its copy of the data block for several updates (a predetermined "competitive threshold"), its copy of the data block is invalidated. Subsequent updates to the data block will not be sent to this processor. When updates are unnecessary, this approach minimizes update bandwidth over the pure write-update protocol. However, the competitive-update approach retains the other disadvantages: it wastes network bandwidth when the updates are not used (e.g. in migratory sharing), it mandates support for write-update protocols in the processors and processor bus protocols and it does not provide any benefit when a processor's cache does not contain a copy of the data block.

Still other past multi-processor system introduced special processor instruction "primitives" that allow a processor to send a data block (or multiple data blocks) to the cache of another processor. When an application (or program) requires that a data block written by one processor must be accessed by another processor, the application's code includes these primitives (at appropriate points in the code) to send the data block from the producer processor's cache to the consumer processor's cache. If the send is completed before the consumer processor accesses the data block, the access can be completed in its cache itself without additional latency. There are several disadvantages with this approach. First, it changes the programming model (e.g., the mechanism used to communicate between processors has been changed) provided to the applications. Existing applications must be re-written or recompiled to obtain any benefit. Second, it requires that the application programmer or the compiler be able to identify the instances when a data block written by one processor would be accessed by another (specific) processor. Third, the approach requires extensions to the processor instruction set and implementation and also requires support for updates in the processor cache design and in the processor bus protocol.

As a result, there has been a long sought need for a speculative recall and forwarding system, which would decrease overall data transfer time or latency between processor caches. A simple to implement system, which could be implemented without requiring any change to the processor architecture, compilers or programming model, has long eluded those skilled in this art.

DISCLOSURE OF THE INVENTION

The present invention provides a system that supports better processor utilization and better application performance by reducing the latency in accessing data by performing proactive speculative data transfers. In being proactive, the system speculates, without specific requests from the processors, as to what data transfers will reduce the latency and will make the data transfers according to information derived from the system at any time that data transfers could be made.

The present invention provides a system that supports better processor utilization and better application performance by reducing the latency in accessing data by performing proactive speculative data forwarding. In being proactive, the system speculates, without specific requests from the processors, as to what data transfers will reduce the latency and will forward the data to a processor likely to need it according to information derived from the system at any time that data transfers could be made.

The present invention provides a system that supports better processor utilization and better application performance by reducing the latency in accessing data by performing proactive speculative data recall. In being proactive, the system speculates, without specific requests from the processors, as to what data transfers will reduce the latency and will recall the modified data from caches according to information derived from the system at any time that data transfers could be made.

The present invention provides a system that supports better processor utilization and better application performance by reducing the latency in accessing data by performing proactive speculative data transfers. In being proactive, the system speculates, without specific requests from the processors, as to what data transfers will reduce the latency and will make the data transfers according to historical information derived from the system at any time that data transfers could be made.

The present invention is simple to implement and can be implemented without requiring any change to the processor architecture, compilers or programming model.

The above and additional advantages of the present invention will become apparent to those skilled in the art from a reading of the following detailed description when taken in conjunction with the accompanying drawings.

BEST MODE FOR CARRYING OUT THE INVENTION

Figure 1:
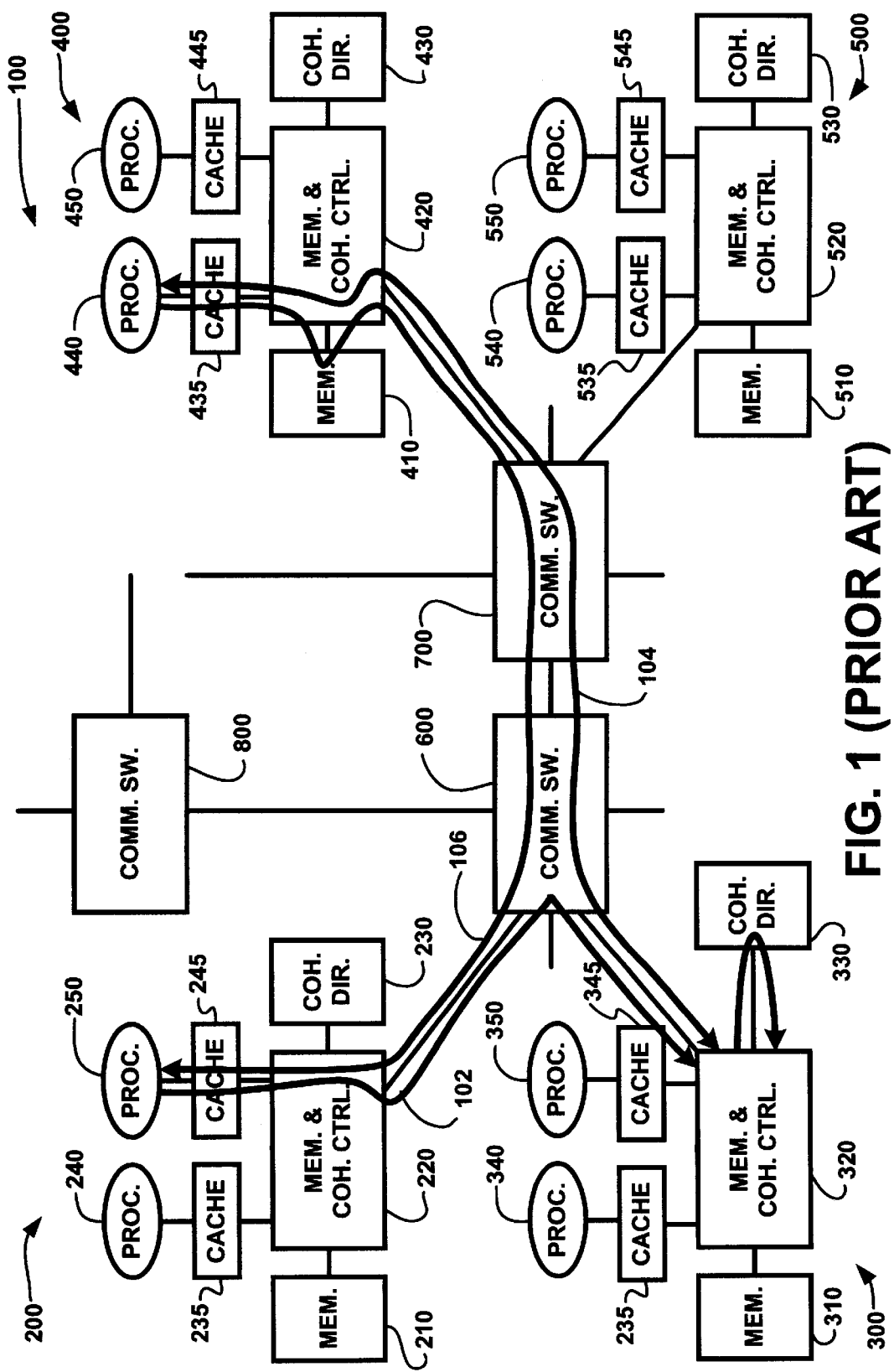
FIG. 1 is a prior art cache-coherent multi-processor computer system with a typical cache-to-cache data transfer.

Referring now to FIG. 1 (PRIOR ART), therein is shown a cache-coherent multi-processor or cache-coherent NUMA (ccNUMA) system 100. The ccNUMA system 100 has a plurality of nodes 200, 300, 400, and 500. The nodes 200 and 300 are connected to a communication switch 600. The nodes 400 and 500 are connected to a communication switch 700. The communication switches 600 and 700 are part of a network, which includes additional communication switches, such as the communication switch 800.

The cache-coherent multi-processor system implements a coherence controller for each memory unit. This maintains coherence of all memory lines in that memory unit. The functionality of the coherence controller is integrated with the functionality of the memory controller of the associated memory unit.

In the ccNUMA system 100, the nodes 200, 300, 400, and 500 contain respective memory units 210, 310, 410, and 510. The memory units 210, 310, 410, and 510 are respectively operatively connected to memory and coherence controllers 220, 320, 420, and 520.

Further, in the ccNUMA system 100, each line of memory (typically a chunk of memory tens of bytes in size) is assigned a home node, such as the node 200, which manages the sharing of that memory line and guarantees its coherence. The home node maintains a directory, which identifies the nodes that possess a copy of that memory line. In the nodes 200, 300, 400, and 500, the coherence directories are respectively 230, 330, 430, and 530. When a node requires a copy of a memory line, it requests the memory line from the home node. The home node supplies the data from its memory unit if it has the latest data. If another node has the latest copy of the data, the home node directs this node to forward the data to the requesting node. The home node employs a coherence protocol to ensure that when a node writes a new value to the memory line, all other nodes see this latest value. The coherence controllers, which are a part of the memory and coherence controllers 220, 320, 420, and 520, implement this coherence functionality.

The memory and coherence controller 220 is operatively connected to a number of caches, such as caches 235 and 245. The caches 235 and 245 are operatively connected to associated processors, such as processors 240 and 250. The memory and coherence controller 320 is operatively connected to the processors 340 and 350 via respective caches 335 and 345. The memory and coherence controller 420 is operatively connected to processors 440 and 450 via respective caches 435 and 445. And the memory and coherence controller 520 is operatively connected to processors 540 and 550 via respective caches 535 and 545.

In operation, when a memory data block (data X) required (for reading or for writing) by the processor 250 is not currently available in its cache 245, a message must be sent to the memory system requesting a copy of the data block. If the required memory data block is present in another processor's cache, such as the cache 435 of processor 440, with a modified value, this new value must be provided to the requesting processor 250 in what is called a "cache-to-cache transfer". With typical coherence protocols, this is accomplished in the following way. When the processor 250 requires access to the data block (data X), it sends a message along arrow 102 to the memory and coherence controller 320, which manages the data block requesting a copy of the data block. The memory and coherence controller 320 determines from a table (not shown) in the coherence directory 330 that the data block is potentially in a modified state in the cache 435 of another processor 440. The memory and coherence controller 320 sends a message along the arrow 104 to the processor 440 requesting that the data block be sent to the processor 250. Upon receiving the message, the processor 440 sends the data block along the arrow 106 to the processor 250 and also notifies the memory and coherence controller 320 that it has done so back along arrow 104.

This exchanging of messages on the network and looking up tables are fairly lengthy operations. Hence, substantial time may elapse between the time access to a data block (data X) is requested by the processor 250 and the time the data block is received from the cache 435 of the processor 440. This latency is especially high when the requesting processor 250, the memory and coherence controller 320 managing the data block and the cache 435 with the modified data are in three different nodes of the system since at least three inter-node messages are necessary. For example, this latency may be about 250 processor clock cycles. As processors continue to increase in their speed relative to the speed of the network and memory, this latency will progressively get higher. In many situations (such as when the processor 250 wants to read the memory data block), the processor 250 cannot perform any useful computation while it waits for the data block to arrive from the cache 435 of the processor 440. This leads to inefficient utilization of expensive processor resources and overall poor performance of the application.

Figure 2:
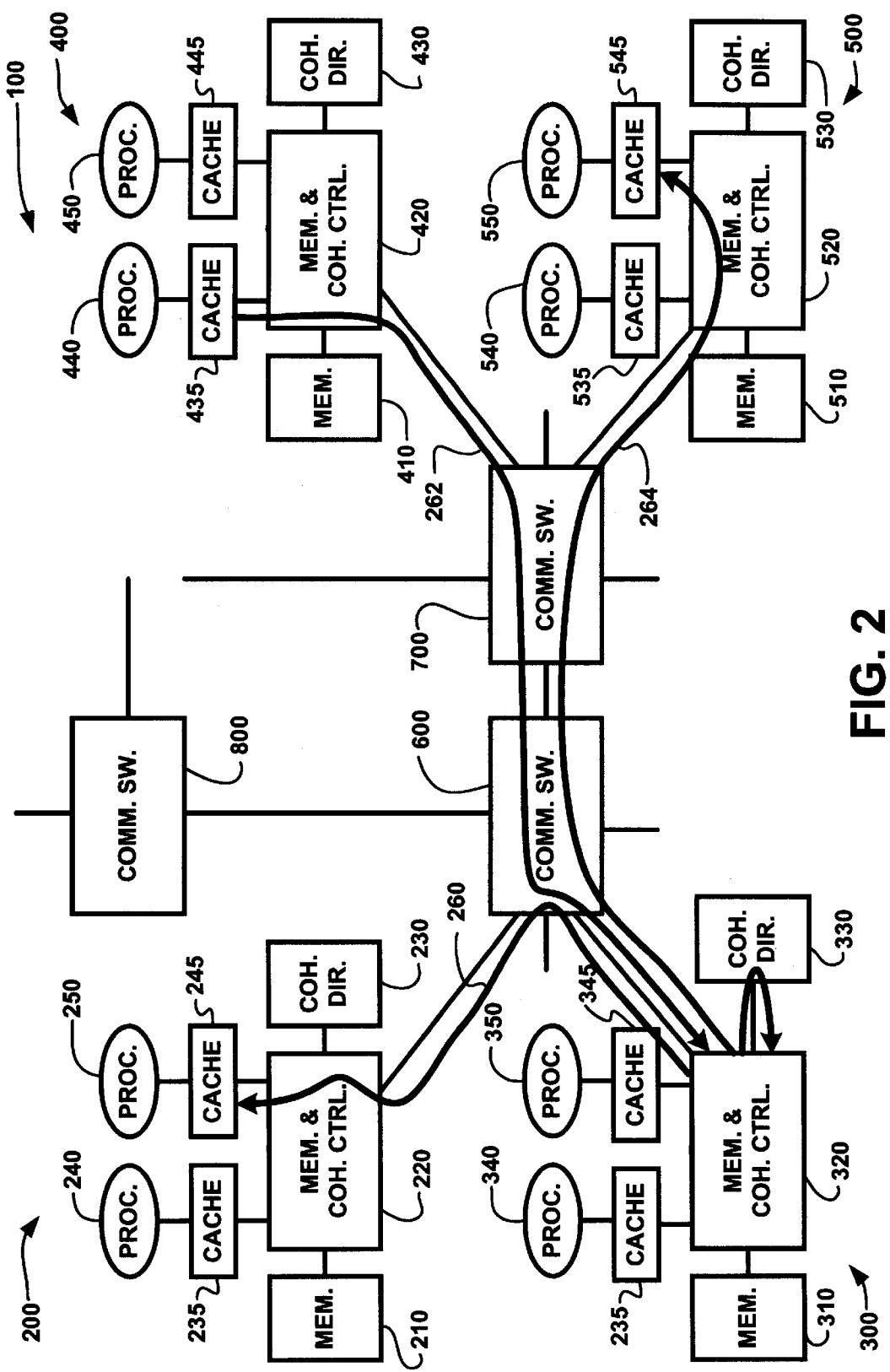
FIG. 2 is the prior art cache-coherent multi-processor computer system of FIG. 1 with write-update coherence protocol.

Referring now to FIG. 2, there is shown the prior art cache-coherent multi-processor system 100 of FIG. 1 (PRIOR ART) with write-update coherence protocol of data blocks. When the processor 440 modifies the copy of the data X in its cache 435, it forwards the modified data Z to the memory and coherence controller 320, which manages data X. The coherence controller 320 determines by looking at the coherence directory 330 that the processors 250 and 550 have copies of the unmodified data X in their respective caches 245 and 545. Therefore, the coherence controller 320 forwards the modified copy of data X to the processors 250 and 550, through the communication switches 600 and 700 along the respective arrows 260 and 264.

Thereafter, when the processor 250 is accessing the data X in its cache 245 it will observe the latest value of the modified data X in its own cache 245. Hence, the access by the processor 250 does not incur the latency of network messages and table lookup. However, this write-update protocol suffers from the disadvantage that a processor, such as a processor 550, which also receives the modified data X in its cache 545, may not use the modified data X at all. This is very wasteful and imposes substantial bandwidth load on the buses, networks and processor caches.

Figure 3:
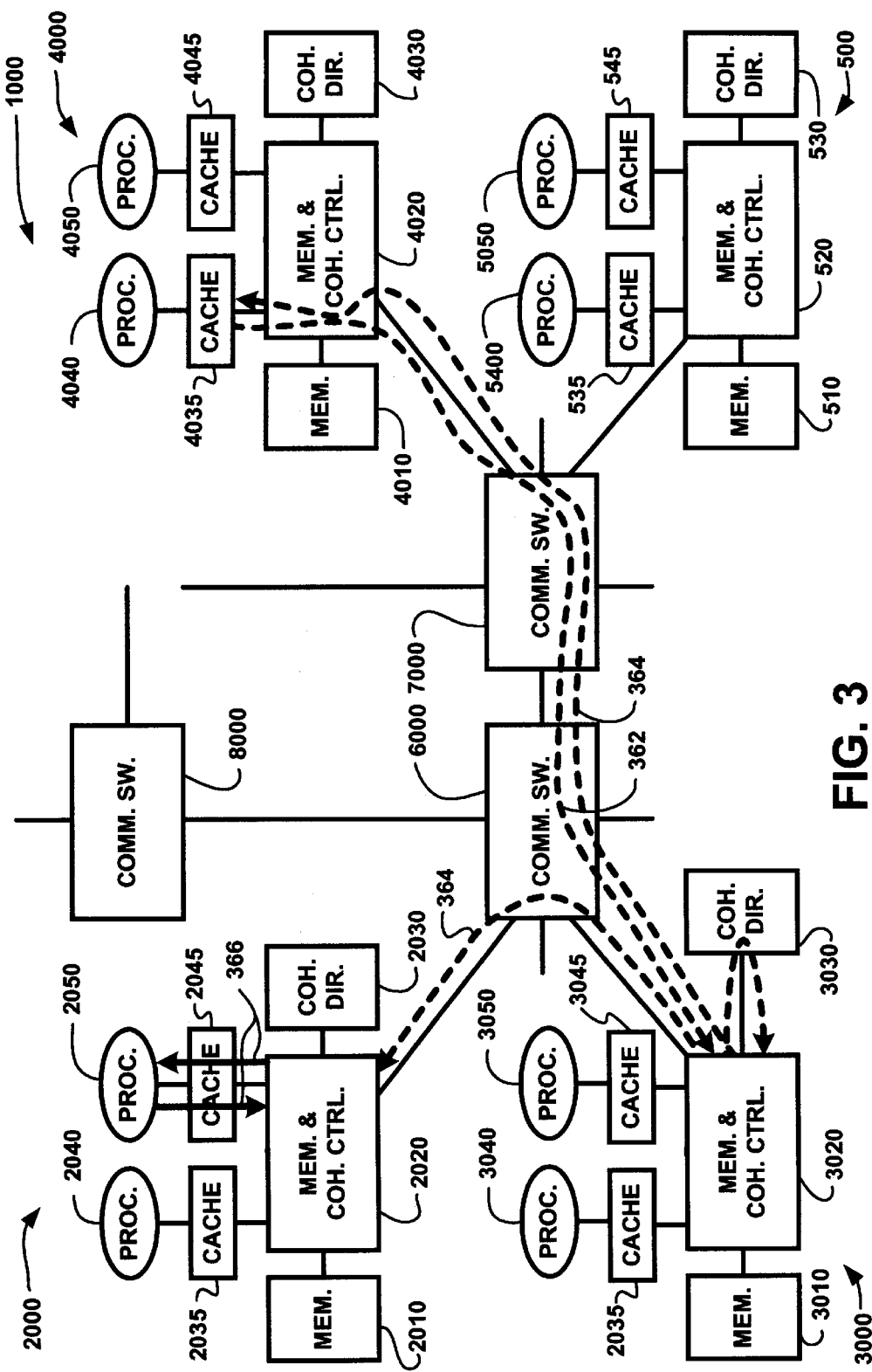
FIG. 3 is a cache-coherent multi-processor computer system of the present invention with history-based speculative recall and forwarding.

Referring now to FIG. 3, there is shown a cache-coherent multi-processor system 1000 of the present invention with history-based speculative recall and forwarding. The cache-coherent multi-processor system 1000 has a plurality of nodes 2000, 3000, 4000, and 5000. The nodes 2000 and 3000 are connected to a communication switch 6000. The nodes 4000 and 5000 are connected to a communication switch 7000. The communication switches 6000 and 7000 are part of a network, which includes additional communication switches, such as communication switch 8000.

The cache-coherent multi-processor system 1000 implements a coherence controller for each memory unit. This maintains coherence of all memory lines in that memory unit. The functionality of the coherence controller is integrated with the functionality of the memory controller of the associated memory unit.

In the cache-coherent multi-processor system 1000, the nodes 2000, 3000, 4000, and 5000 contain respective memory units 2010, 3010, 4010, and 5010. The memory units 2010, 3010, 4010, and 5010 are respectively operatively connected to memory and coherence controllers 2020, 3020, 4020, and 5020.

Further, in the cache-coherent multi-processor system 1000, each line of memory (typically a chunk of memory tens of bytes in size) is assigned a home node, such as the node 2000, which manages the sharing of that memory line and guarantees its coherence. The home node maintains a directory, which identifies the nodes that possess a copy of that memory line. In the nodes 2000, 3000, 4000, and 5000, the coherence directories are respectively 2030, 3030, 4030, and 5030. When a node requires a copy of a memory line, it requests the memory line from the home node. The home node supplies the data from its memory unit if it has the latest data. If another node has the latest copy of the data, the home node directs this node to forward the data to the requesting node. The home node employs a coherence protocol to ensure that when a node writes a new value to the memory line, all other nodes see this latest value. The coherence controllers, which are a part of the memory and coherence controllers 2020, 3020, 4020, and 5020, implement this coherence functionality.

The memory and coherence controllers 2020 are operatively connected to a number of caches, such as caches 2035 and 2045. The caches 2035 and 2045 are operatively connected associated processors, such as processors 2040 and 2050. The memory and coherence controllers 3020 are operatively connected to the processors 3040 and 3050 via respective caches 3035 and 3045. The memory and coherence controllers 4020 are operatively connected to processors 4040 and 4050 via respective caches 4035 and 4045. And memory and coherence controllers 5020 are operatively connected to processors 5040 and 5050 via respective caches 5035 and 5045.

In operation, for instance if a data block (data X) shows the recurrent behavior that it is modified in the cache 4035 of the processor 4040 and is then transferred to the cache 2045 of the processor 2050, then it is likely to repeat such behavior again. The functionality of the memory and coherence controller 3020 is extended to monitor the occurrence of cache-to-cache transfers. If this specific data block (data X) shows recurrent cache-to-cache transfers, after subsequent writes to the data block, the data block is retrieved from the writing processor 4040 along the dotted lines 362 and 364 even before the data block is requested by any other processor. The retrieval is "proactive" in that it is performed without a request from any processor just based on the system information regarding the repetition. This allows a subsequent read request by the processor 2050 to be satisfied with lower latency. If the identity of the reading processor, such as processor 2050 can also be predicted a priori with reasonable accuracy, this latency can be lowered even further by speculatively forwarding the data block along the dotted line 364 to a cache, such as cache 2045 located closer to this processor 2050. As a result, there is reduced the latency incurred by a processor's access along the solid lines 366 to a data block that is modified in another processor's cache by proactively retrieving the data block from the latter processor's cache prior to the access.

The proactive retrieval of modified data is referred to as a "proactive speculative recall". Since issuing speculative recalls indiscriminately to arbitrary data blocks can adversely affect performance, the present invention employs a history-based mechanism to identify which data blocks should be speculatively recalled and when they should be speculatively recalled. The history mechanism tracks the pattern and timing of cache-to-cache transfers of data blocks. Speculative recalls are used for a data block only if the data block's history indicates that its cache-to-cache transfers are predictable and that accelerating these transfers is likely to improve performance. Once a data block has been speculatively recalled, it can also be "proactively speculatively forwarded" to a cache where it is available closer to a processor likely to request it.

Figure 4:
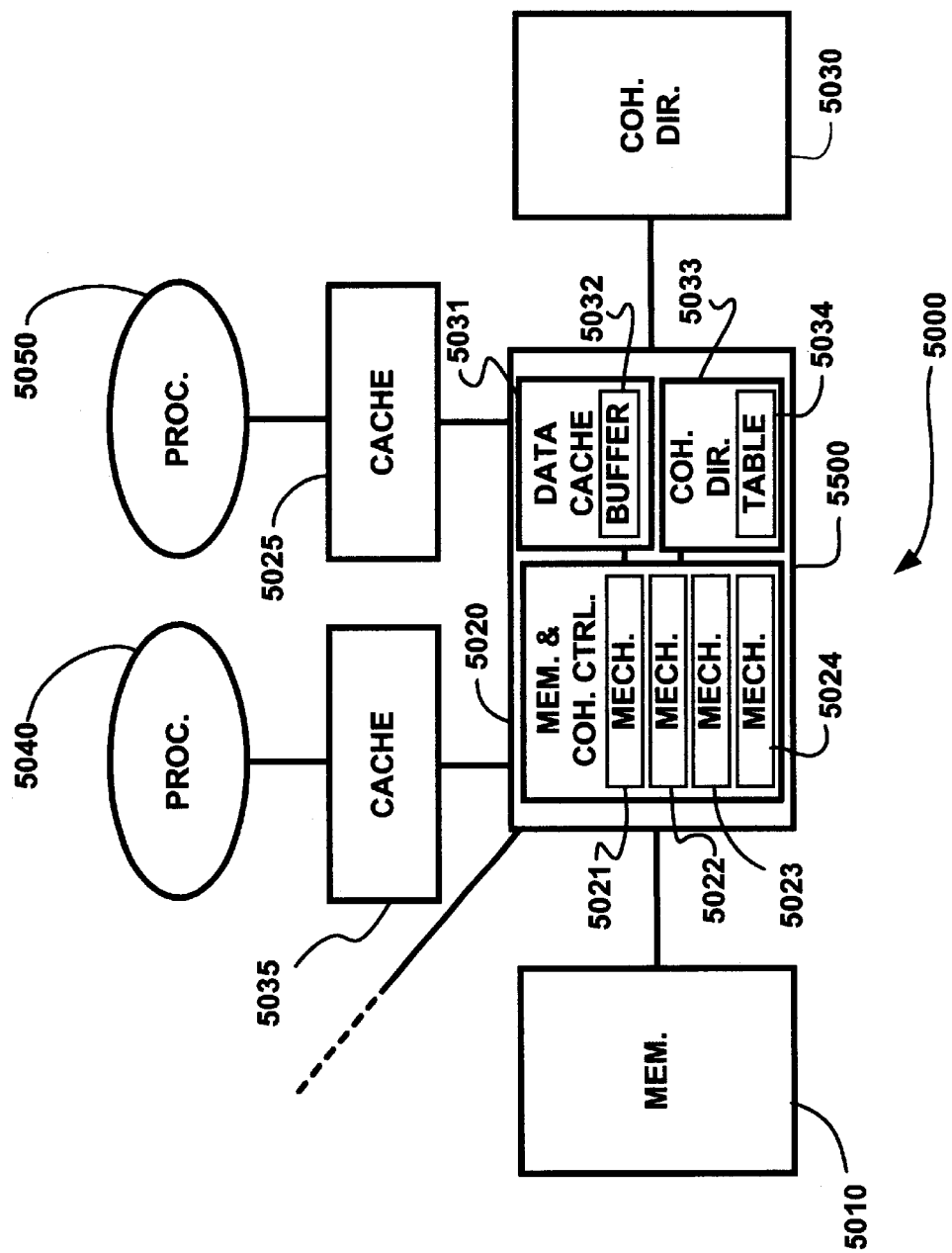
FIG. 4 illustrates the components of the memory and coherence controller chip.

Referring now to FIG. 4, there is shown the node 5000 in the cache-coherent multi-processor system 1000 of FIG. 3. The node 5000 contains the memory and coherence controller 5020 in which a block pruning mechanism 5021, a blocking profiling mechanism 5022, a speculative recall mechanism 5023, and a speculative forwarding mechanism 5024 of the present invention are embedded. Within the memory and coherence controller 5020 are a data cache 5031, which contains a buffer 5032, and a coherency directory 5033, which contains a block profile table 5034.

The functionality of the block pruning mechanism 5021, the blocking profiling mechanism 5022, the speculative recall mechanism 5023, and the speculative forwarding mechanism 5024 of the present invention can be easily integrated with the traditional hardware needed to build cache-coherent multi-processor systems, such as the cache-coherent multi-processor system 100 of FIG. 1 (PRIOR ART). The heuristics and algorithms associated with these mechanisms can be embedded in the memory and coherence controller chips managing the coherence as well as in other parts of a cache coherent multi-processor system. Further, the various mechanisms may be included or excluded in various combinations, which would be obvious to those skilled in the art.

In particular, the block pruning mechanism 5021 identifies the subset of data blocks, which have two properties: they have frequent cache-to-cache transfers and their cache-to-cache transfers are predictable. Accelerating cache-to-cache transfers of this subset of the data blocks is likely to be effective and improve performance so the other data blocks are "pruned".

For the data blocks identified by the block pruning mechanism 5021, the block profiling mechanism 5022 gathers "profiles" or information about the timing of its cache-to-cache transfers and the processors involved in the cache-to-cache transfers. The speculative recall mechanism 5023 issues proactive speculative recalls to specific data blocks at specific times based on the information collected by the block pruning mechanism 5021 and the block profiling mechanism 5022. The speculative forwarding mechanism 5024 can subsequently proactively forward the block based on the information collected by the block profiling mechanism 5022 so that it is available closer to a requesting processor.

More specifically, the block pruning mechanism 5021 works in conjunction with the memory and coherence controller 5020, which maintains a directory entry in the coherence directory 5030 for every memory block managed by the memory and coherence controller 5020 identifying the processors sharing that data block. The block pruning mechanism 5021 maintains a few additional bits (cache-to-cache bits) with each directory entry, which indicate whether previous writes to the data block, were followed by a cache-to-cache transfer. When a processor requires read or write access to a data block managed by the memory and coherence controller 5020, it requests the appropriate permission from the memory and coherence controller 5020. After a write request is granted, one of two scenarios is possible. The processor modifying the data block can itself return the data block back to the memory and coherence controller 5020 (called a write-back) or a different processor can request access to the data block causing a cache-to-cache transfer. If the data block is written back, a zero is shifted into the cache-to-cache bits to indicate that the write was not followed by a cache-to-cache transfer. If a cache-to-cache transfer occurs, a one is shifted into the cache-to-cache bits to indicate that the write was followed by a cache-to-cache transfer. For example, four cache-to-cache bits identify whether the previous four writes to a data block were followed by cache-to-cache transfers of the data block. A data block for which all or most of the cache-to-cache bits are one has recurrent and fairly predictable cache-to-cache transfers. These data blocks are selected as candidates for block profiling and speculative recall processing. To improve confidence in the measurement of cache-to-cache transfer frequency, all cache-to-cache bits can be cleared periodically.

When a data block is selected as a candidate for proactive speculative recall, the block profiling mechanism 5022 collects information about the usage pattern of the data block. The block profiling mechanism 5022 maintains the block profile table 5034 with an entry for each data block that is being profiled. The table entry for a data block records information about the last few writes (about four in the best mode) to the data block. For each write, the table entry contents include the time interval between the write request and the read request immediately following it, the identity of the processor writing to the data block and the identity of the processor reading from the data block. Other useful information includes the number of read requests between write requests. This information is used by the speculative recall mechanism 5023 in determining when the proactive speculative recall should be issued. The proactive speculative recall may be heuristically optimized for a given system.

The above information can also be used by the speculative forwarding mechanism 5024 in determining where the data block should be forwarded. When the entry for a data block fills up, the oldest write information maintained in the entry is discarded to accommodate information about new writes. The number of entries in the block profile table 5034 is also bounded. When space is not available to maintain profile information for a new data block, one of the existing entries is freed up using a suitable replacement algorithm.

In particular, the speculative recall mechanism 5023 is responsible for proactively recalling modified data from processors' caches. This speculative recall mechanism 5023 employs a heuristic using the information collected by the block pruning mechanism 5021 and the block profiling mechanism 5022 to selectively issue speculative recalls. For example, the heuristic may issue speculative recalls only to data blocks for which three of the last four writes have been followed by cache-to-cache transfers. Likewise, speculative recalls may be issued at a time computed based on the block profiling measures of the time interval between a write request and the subsequent read request (e.g., issue speculative recall at a time 20% less than the average of the time interval measures recorded in the entry). Several alternative heuristics are available and they can be chosen based on their effectiveness for specific application workloads. The speculative recall mechanism 5023 also compiles information that provides feedback on its effectiveness. Such information includes the number of instances when a speculative recall to a processor was followed by a request from the same processor, the number of instances when a read request was received before the speculative recall was completed, the number of instances speculative recall was successful and so on. This feedback information is used by the speculative recall mechanism 5023 to dynamically adjust its heuristic and by the block profiling mechanism 5022 to select replacement candidates from its block profile table 5034.

More particularly, the speculative forwarding mechanism 5024 is an optional mechanism that can move the data block closer to a processor that is expected to subsequently require access to the data block. This speculative forwarding mechanism 5024 may be triggered after a data block has been successfully speculatively recalled (i.e., the data block has been received in response to the speculative recall) if the processor that is expected to next access the data block can be reliably predicted from the block profile information. A heuristic mechanism determines if the processor that is likely to access the data block next can be predicted from the processor identities recorded in the block profile table 5034. When a processor is identified, the data block is forwarded to a cache that is close to the processor. This cache may be a small buffer, such the buffer 5032, dedicated solely for the speculative forwarding or may be part of a standard cache external to the processor complex (such as a Level-3 cache). If the processor and processor bus support update protocols, the speculative forwarding mechanism 5024 can accelerate to processor cache. It should be understood that the speculative forwarding mechanism 5024 may also be used with data blocks that have not been speculatively recalled.

From the foregoing detailed description, it can be seen that the present invention provides a cache-coherent multi-processor system 1000 which can accelerate cache-to-cache transfers that cannot be predicted at compile-time and can also lower latencies of accesses from processors which did not previously have a copy of the data block. The speculative recall mechanism 5023 of the present invention can lower latencies and improve performance even where the processor, which will subsequently access the data block, cannot be known or predicted a priori.

Further, the block pruning mechanism 5021 could also provide recall-frequency based pruning where data blocks are selected, or unpruned, for data block profiling, speculative recall, and/or speculative forwarding only if they accumulate a minimum fixed threshold number of processor write requests as well as a minimum fixed threshold fraction of access involving cache-to-cache transfers. The pruning mechanism 5021 could also provide forwarding-frequency based pruning where data blocks are selected, or unpruned, for data block profiling and/or speculative forwarding only if they accumulate a minimum fixed threshold number of write requests.

Further, the block profiling mechanism 5022 could provide access-count profiling where the number of accesses (to any data block) between a write to a data block and the subsequent read to the data block are counted and the count used to determine when the data block should be proactively transferred after a write. The block profiling mechanism 5022 could also provide address-pattern profiling where the sequence of data block addresses accessed by a processor prior to requesting a data block that was written by another processor are tracked and the pattern used to determine when and where a data block should be proactively transferred after being written by a processor.

Further, the speculative recall mechanism 5023 could provide speculative recall profiling where the number of speculative recalls can be counted in various categories, such as those that were "premature", "late", and/or "successful". These categorized counts could be used to adjust when speculative recalls are issued with the probability being set to be the highest for those having the highest successful counts.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the spirit and scope of the included claims. All matters set forth herein or shown in the accompanying drawings are to be interpreted in an illustrative and non-limiting sense.

What is claimed is:

1. A multi-processor computer system comprising:
   a plurality of memory units;
   a plurality of memory and coherence controllers operatively connected to the plurality of memory units;
   a plurality of caches operatively connected to the plurality of memory and coherence controllers;
   a plurality of processors operatively connected to the plurality of caches;

a plurality of nodes, each of the plurality of nodes formed from a group consisting of at least one of the plurality of memory units, memory and coherence controllers, caches, processors, and a combination thereof;

a communication switch connected to the plurality of nodes;

a coherence directory connected to each of the plurality of memory and coherence controllers for maintaining coherence information for the memory units in the plurality of nodes connected to the communication switch; and a proactive speculative mechanism for proactively transferring data between the plurality of caches, the proactive speculative mechanism includes a proactive speculative forwarding mechanism for proactively providing data forwarding between the plurality of caches and a history compiler for proactively providing data forwarding between the plurality of caches based on history information wherein the history compiler for proactively providing data forwarding between the plurality of caches is based on history information regarding previous proactive speculative forwarding.

2. The multi-processor computer system as claimed in claim 1 wherein the history compiler for proactively providing data forwarding between the plurality of caches based on history information regarding previous proactive speculative forwarding includes a data profiling mechanism.

3. The multi-processor computer system as claimed in claim 1 wherein the history compiler for proactively providing data forwarding between the plurality of caches based on history information regarding previous proactive speculative forwarding includes a data profiling mechanism for access-count profiling.

4. The multi-processor computer system as claimed in claim 1 wherein the history compiler for proactively providing data forwarding between the plurality of caches based on history information regarding previous proactive speculative forwarding includes a data address-pattern profiling mechanism.

5. The multi-processor computer system as claimed in claim 1 wherein the history compiler for proactively providing data forwarding between the plurality of caches based on history information regarding previous proactive speculative forwarding includes a data pruning mechanism.

6. The multi-processor computer system as claimed in claim 1 wherein the history compiler for proactively providing data forwarding between the plurality of caches based on history information regarding previous proactive speculative forwarding includes a data recall-frequency pruning mechanism.

7. The multi-processor computer system as claimed in claim 1 wherein the history compiler for proactively providing data forwarding between the plurality of caches based on history information regarding previous proactive speculative forwarding includes a data forwarding-frequency pruning mechanism.

8. The multi-processor computer system as claimed in claim 1 wherein the proactive speculative mechanism includes a proactive speculative recall mechanism for proactively providing data recall between the plurality of caches.

9. The multi-processor computer system as claimed in claim 8 wherein the proactive speculative recall mechanism includes a history compiler for proactively providing data recall between the plurality of caches based on history information.

10. The multi-processor computer system as claimed in claim 9 wherein the history compiler for proactively providing data recall between the plurality of caches based on history information regarding previous proactive speculative calls.

11. The multi-processor computer system as claimed in claim 10 wherein the history compiler for proactively providing data recall between the plurality of caches based on history information regarding previous proactive speculative recalls includes a data profiling mechanism.

12. The multi-processor computer system as claimed in claim 10 wherein the history compiler for proactively providing data recall between the plurality of caches based on history information regarding previous proactive speculative recalls includes a data profiling mechanism for access-count profiling.

13. The multi-processor computer system as claimed in claim 10 wherein the history compiler for proactively providing data recall between the plurality of caches based on history information regarding previous proactive speculative recalls includes a data address-pattern profiling mechanism.

14. The multi-processor computer system as claimed in claim 10 wherein the history compiler for proactively providing data recalls between the plurality of caches based on history information regarding previous proactive speculative recalls includes a data pruning mechanism.

15. The multi-processor computer system as claimed in claim 10 wherein the history compiler for proactively providing data recall between the plurality of caches based on history information regarding previous proactive speculative recall includes a data recall-frequency pruning mechanism.

16. The multi-processor computer system as claimed in claim 10 wherein the history compiler for proactively providing data recall between the plurality of caches based on history information regarding previous proactive speculative recalls includes a data categorized-count profiling mechanism.

17. The multi-processor computer system as claimed in claim 1 wherein the proactive speculative mechanism includes a history compiler for proactively transfering data between the plurality of caches based on history information whereby the mechanism speculates and proactively transfers data without requests from the plurality of processors.

18. A multi-processor computer system comprising:

a plurality of memory units;

a plurality of memory and coherence controllers operatively connected to the plurality of memory units;

a plurality of caches operatively connected to the plurality of memory and coherence controllers;

a plurality of processors operatively connected to the plurality of caches;

a plurality of nodes, each of the plurality of nodes formed from a group consisting of at least one of the plurality of memory units, memory and coherence controllers, caches, processors, and a combination thereof;

a communication switch connected to the plurality of nodes;

a coherence directory connected to each of the plurality of memory and coherence controllers for maintaining coherence information for the memory units in the plurality of nodes connected to the communication switch; and a proactive speculative mechanism for proactively transferring data blocks between the plurality of caches during an access to a data block whereby data blocks can be transferred without requests from the plurality of processors.

19. The multi-processor computer system as claimed in claim 18 wherein the proactive speculative mechanism includes a proactive speculative forwarding mechanism for proactively providing data block forwarding between the plurality of caches in the plurality of nodes.

20. The multi-processor computer system as claimed in claim 1 wherein the proactive speculative forwarding mechanism includes a history compiler for proactively providing data block forwarding between the plurality of caches based on history information.

21. The multi-processor computer system as claimed in claim 20 wherein the history compiler for proactively providing data block forwarding between the plurality of caches based on history information regarding previous proactive speculative forwarding.

22. The multi-processor computer system as claimed in claim 21 wherein the history compiler for proactively providing data block forwarding between the plurality of caches based on history information regarding previous proactive speculative forwarding includes a data block profiling mechanism.

23. The multi-processor computer system as claimed in claim 21 wherein the history compiler for proactively providing data block for forwarding between the plurality of caches based on history information regarding previous proactive speculative forwarding includes a data block profiling mechanism for access-count profiling in which the number of write requests by a processor between a write to a data block and a subsequent read to the data block are counted and the data blocks are provided to processors having more than a fixed number of write requests.

24. The multi-processor computer system as claimed in claim 21 wherein the history compiler for proactively providing data block forwarding between the plurality of caches based on history information regarding previous proactive speculative forwarding includes a data block address-pattern profiling mechanism in which the sequence of data block addresses accessed by a processor prior to requesting a data block written to by another processor are tracked and the pattern used to determine when and where to transfer the data block that has been written to by the another processor.

25. The multi-processor computer system as claimed in claim 21 wherein the history compiler for proactively providing data block forwarding between the plurality of caches based on history information regarding previous proactive speculative forwarding includes a data block pruning mechanism.

26. The multi-processor computer system as claimed in claim 21 wherein the history compiler for proactively providing data block forwarding between the plurality of caches based on history information regarding previous proactive speculative forwarding includes a data block recall-frequency pruning mechanism in which a data block is pruned unless it has a fixed number of accesses of which a fixed fraction involved data block recalls.

27. The multi-processor computer system as claimed in claim 21 wherein the history compiler for proactively providing data block forwarding between the plurality of caches based on history information regarding previous proactive speculative forwarding includes a data block forwarding-frequency pruning mechanism in which a data block is pruned unless it has a fixed number of accesses.

28. The multi-processor computer system as claimed in claim 18 wherein the proactive speculative mechanism includes a proactive speculative recall mechanism for proactively providing data block recall between the plurality of caches.

29. The multi-processor computer system as claimed in claim 28 wherein the proactive speculative recall mechanism includes a history compiler for proactively providing data block recall between the plurality of caches based on history information.

30. The multi-processor computer system as claimed in claim 29 wherein the history compiler for proactively providing data block recall between the plurality of caches based on history information regarding previous proactive speculative recalls, writes to the data block, read requests following the writes, the identity of the writing processor, and the identity of the reading processor.

31. The multi-processor computer system as claimed in claim 30 wherein the history compiler for proactively providing data block recall between the plurality of caches based on history information regarding previous proactive speculative recalls includes a data block profiting mechanism.

32. The multi-processor computer system as claimed in claim 30 wherein the history compiler for proactively providing data block recall between the plurality of caches based on history information regarding previous proactive speculative recalls includes a data block profiling mechanism for access-count profiling in which tee number of write requests by a processor between a write to a data block and a subsequent read to the data block are counted and the data blocks are provided to processors having more than a fixed number of write requests.

33. The multi-processor computer system as claimed in claim 30 wherein the history compiler for proactively providing data block recalls between the plurality of caches based on history information regarding previous proactive speculative recalls includes a data pruning mechanism.

34. The multi-processor computer system as claimed in claim 30 wherein the history compiler for proactively providing data block recall between the plurality of caches based on history information regarding previous proactive speculative recalls includes a data block address-pattern profiling mechanism in which the sequence of data block addresses accessed by a processor prior to requesting a data block written to by another processor are tracked and the pattern used to determine when and where to transfer the data block that has been written to by the another processor.

35. The multi-processor computer system as claimed in claim 30 wherein the history compiler for proactively providing data block recall between the plurality of caches based on history information regarding previous proactive speculative recall includes a data block recall-frequency pruning mechanism in which a data block is pruned unless it has a fixed number of write accesses of which a fixed fraction involved data block cache-to-cache transfers.

36. The multi-processor computer system as claimed in claim 30 wherein the history compiler for proactively providing data block recall between the plurality of caches based on history information regarding previous proactive speculative recalls includes a data block categorized-count profiling mechanism based on the number of speculative recalls which are categorized as premature, late, or successful.

37. The multi-processor computer system as claimed in claim 18 wherein the proactive speculative mechanism includes a history compiler for proactively transfering data blocks between the plurality of caches based on history information whereby the mechanism speculates and proactively transfers data without requests from the plurality of processors.

* * * * *